US012658462B1

(12) United States Patent  
Gould et al.

(10) Patent No.: US 12,658,462 B1  
(45) Date of Patent: Jun. 16, 2026

(54) HYDROGEN FUEL CELL POWER SOURCE WITH METAL BIPOLAR PLATES

(71) Applicant: The Government of the United States of America, as represented by the Secretary of the Navy, Arlington, VA (US)

(72) Inventors: Benjamin D. Gould, Springfield, VA (US); Michael Schuette, Vienna, VA (US); Joseph Rodgers, Jessup, MD (US); Ravi Ramamurti, Silver Spring, MD (US); Karen Swider-Lyons, Alexandria, VA (US); Keith Bethune, Honolulu, HI (US)

(73) Assignee: The Government of the United States of America, as represented by the Secretary of the Navy, Arlington, VA (US)

( * ) Notice: Subject to any disclaimer, the term of this patent is extended or adjusted under 35 U.S.C. 154(b) by 2586 days.

(21) Appl. No.: 15/932,050

(22) Filed: Nov. 20, 2017

Related U.S. Application Data

(60) Provisional application No. 62/423,975, filed on Nov. 18, 2016.

(51) Int. Cl.

| | |
|---|---|
| *H01M 8/22* | (2006.01) |
| *B64U 50/32* | (2023.01) |
| *H01M 8/0247* | (2016.01) |
| *H01M 8/0265* | (2016.01) |
| *H01M 8/04111* | (2016.01) |

(52) U.S. Cl.  
CPC .............. *H01M 8/22* (2013.01); *B64U 50/32* (2023.01); *H01M 8/0247* (2013.01); *H01M 8/0265* (2013.01); *H01M 8/04111* (2013.01); *B64U 2201/20* (2023.01); *H01M 2250/20* (2013.01)

(58) Field of Classification Search  
None  
See application file for complete search history.

(56) References Cited

U.S. PATENT DOCUMENTS

| | | | | | |
|---|---|---|---|---|---|
| 2004/0151975 A1* | 8/2004 | Allen | .................. | H01M 8/0206 | |
| | | | | | 72/379.6 |
| 2004/0219401 A1* | 11/2004 | Hobmeyr | .............. | F04D 29/706 | |
| | | | | | 429/415 |
| 2005/0042488 A1* | 2/2005 | Niedzwiecki | ..... | H01M 8/04947 | |
| | | | | | 429/432 |
| 2006/0134502 A1* | 6/2006 | Garceau | .............. | H01M 8/0263 | |
| | | | | | 429/434 |
| 2009/0291341 A1* | 11/2009 | Miyata | .............. | H01M 8/04089 | |
| | | | | | 429/513 |
| 2010/0250022 A1* | 9/2010 | Hines | ................... | G05D 1/0094 | |
| | | | | | 701/2 |
| 2016/0093898 A1 | 3/2016 | Gould et al. | | | |

FOREIGN PATENT DOCUMENTS

| | | | | | |
|---|---|---|---|---|---|
| CN | 101609899 A | * | 12/2009 | | |
| CN | 203659991 U | * | 6/2014 | | |
| KR | 20160125602 A | * | 11/2016 | | |
| WO | WO-03092096 A2 | * | 11/2003 | .......... | H01M 8/0202 |

OTHER PUBLICATIONS

Machine translation of CN 101609899 A, published on Dec. 23, 2009 (Year: 2009).*  
Fuel Cells, U.S. Department of Energy, Nov. 2015 (Year: 2015).*  
Machine translation of CN 203659991 U, published on Jun. 18, 2014 (Year: 2014).*  
Machine translation of KR 10-2016-0125602 A, published in Nov. 1, 2016 (Year: 2016).*  
Atkinson et al., "Gas Diffusion Media for Open-Cathode Fuel Cells in Atmospheric Flight" ECS Transactions, 75 (14) 531-545 (2016).  
Atkinson et al., "An Open-Cathode Fuel Cell for Atmospheric Flight" Journal of The Electrochemical Society, 164 (2) F46-F54 (2017).  
Dubas et al., "Design of a High-Speed Permanent Magnet Motor for the Drive of a Fuel Cell Air-Compressor" Vehicle Power and Propulsion, 2005 IEEE Conference.  
Hermann et al., "Bipolar plates for PEM fuel cells: A review" International Journal of Hydrogen Energy 30 (2005) 1297-1302.  
Sassin et al., "Impact of Compressive Stress on MEA Pore Structure and Its Consequence on PEMFC.Performance" Journal of The Electrochemical Society, 163 (8) F808-F815 (2016).  
Sassin et al., "Fabrication Method for Laboratory-Scale High-Performance Membrane Electrode Assemblies for Fuel Cells" Anal. Chem. 2017, 89, 511?518.

* cited by examiner

*Primary Examiner* — Anca Eoff  
(74) *Attorney, Agent, or Firm* — US Naval Research Laboratory; Joseph T. Grunkemeyer

(57) ABSTRACT

Disclosed herein is an apparatus having: a polymer electrolyte membrane fuel cell stack capable of generating 1-6 kw and a compressor capable of delivering at least 10 g/s of air at 1 2 bar. The compressor is coupled to an air inlet of the fuel cell stack.

9 Claims, 9 Drawing Sheets

Rotation Axis

6C

6C

Rotation Axis

FIG. 6

HYDROGEN FUEL CELL POWER SOURCE WITH METAL BIPOLAR PLATES

This application claims the benefit of U.S. Provisional Application No. 62/423,975, filed on Nov. 18, 2016. The provisional application and all other publications and patent documents referred to throughout this nonprovisional application are incorporated herein by reference.

TECHNICAL FIELD

The present disclosure is generally related to fuel cells that may be used in unmanned aerial vehicles.

DESCRIPTION OF RELATED ART

Hydrogen fuel cells are gaining favor worldwide as electrochemical power sources for vehicle propulsion. Hydrogen fuel cells use catalyzed membranes to convert hydrogen and oxygen in air to electricity, heat, and water. Previous processes for manufacturing fuel cell systems in the 1-6 kW power range used milled graphite bipolar plate or molded carbon bipolar plates (U.S. Pat. Nos. 8,124,292; 7,476,455). Automotive fuel cell power systems (~100 kW) use formed metals, but they are much larger in size and don't meet the strict volume and weight requirements of aeronautical systems (U.S. Pat. No. 6,849,352). Fuel cell systems with carbon bipolar plates are limited by their weight, volume, and reliability. Metal bipolar plates can be much thinner than those made of carbon causing them to be smaller (lower volume) and lighter per cell. Metal bipolar plates also form hermetic seals between the fluid streams leading to better reliability due to less failure from leaks, while carbon bipolar plates are porous or suffer from micro cracks which can cause deleterious leaks.

BRIEF SUMMARY

Disclosed herein is an apparatus comprising: a polymer electrolyte membrane fuel cell stack capable of generating 1-6 kW and a compressor capable of delivering at least 10 g/s of air at 1-2 bar. The compressor is coupled to an air inlet of the fuel cell stack.

BRIEF DESCRIPTION OF THE DRAWINGS

A more complete appreciation will be readily obtained by reference to the following Description of the Example Embodiments and the accompanying drawings.

FIG. 6 shows detailed mechanical drawings of a formed metal bipolar plate.

DETAILED DESCRIPTION OF EXAMPLE EMBODIMENTS

In the following description, for purposes of explanation and not limitation, specific details are set forth in order to provide a thorough understanding of the present disclosure. However, it will be apparent to one skilled in the art that the present subject matter may be practiced in other embodiments that depart from these specific details. In other instances, detailed descriptions of well-known methods and devices are omitted so as to not obscure the present disclosure with unnecessary detail.

Disclosed herein is a lightweight fuel cell system that operates in the 1-6 kW range. One application is unmanned aerial systems, but it would be suitable for many power requirements. Characteristics include a miniaturized compressor, formed metal bipolar plates with symmetric flow fields, a novel compression plate with titanium strap tensioners, and a hydrogen recovery unit.

Figure 1:
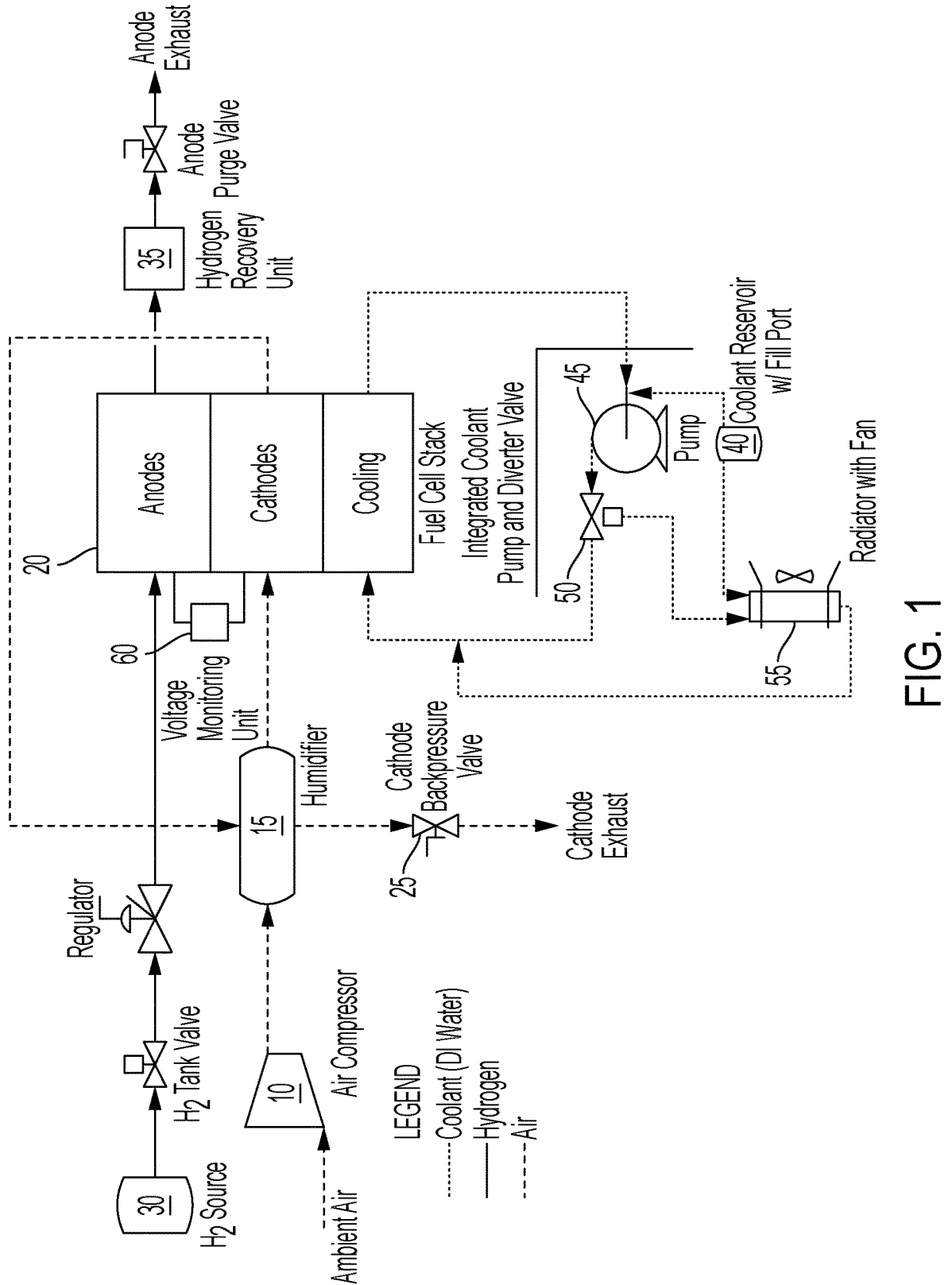
FIG. 1 shows a process flow diagram of a fuel cell system.

The process flow diagram of a fuel cell system 5 is presented in FIG. 1. The fuel cell system is comprised of: a miniature air compressor or blower 10, a humidifier 15, a fuel cell stack 20 with symmetric metal bipolar plates, a cathode back pressure control valve 25, a hydrogen source 30 with the preferred embodiment being a carbon fiber overwrapped aluminum pressure vessel with a lightweight single stage regulator as described in U.S. patent application Ser. No. 12/803,051 (incorporated herein by reference), a hydrogen recovery unit 35, a coolant reservoir 40, a coolant pump 45, a radiator bypass control valve 50, a lightweight aluminum radiator 55, and a voltage monitoring unit 60. All components are controlled by a microprocessor controller.

There are four major streams in the system of which three are fluidic and the fourth is data. The three fluid streams are: hydrogen (solid lines), air (dashed lines), and coolant (dotted lines). Coolant can be de-ionized water, but a glycol-based coolant may be preferred. Hydrogen is stored in a hydrogen storage tank or other source 30 and is fed into the fuel cell stack 20 where it reacts with air to form water and electricity. Excess hydrogen is recycled to the stack by hydrogen recovery unit 35 to increase the overall system efficiency.

Air is gathered from the ambient atmosphere and is compressed by the air compressor 10 and delivered into the humidifier 15 to recover water from the fuel cell stack 20 exhaust. Air exits the humidifier 15 with increased water content and then flows into the fuel cell stack 20 where it reacts with hydrogen to form water. The air pressure inside the stack is controlled by the back pressure control valve 25 which is connected to the wet-side of the humidifier 15.

During warm up of the stack, coolant is circulated from the coolant reservoir 40 by the coolant pump 45 through the stack 20 and the air compressor 10 (not shown) bypassing the radiator 55. To maintain the temperature of the stack during operation, coolant is circulated from the coolant reservoir 40 by the coolant pump 45 through the fuel cell stack 20, radiator 55, and air compressor 10 (not shown) during operation. Whether the radiator is bypassed by the cooling loop is controlled by the position of bypass valve 50. A liquid cooled air compressor may be preferred, but an air coolant air compressor is an alternative embodiment.

The fourth stream is data transfer between the sensors and the micro-controller. The microcontroller primarily controls the speed command to the air compressor 10 and the position of the coolant bypass valve 50.

Figure 2:
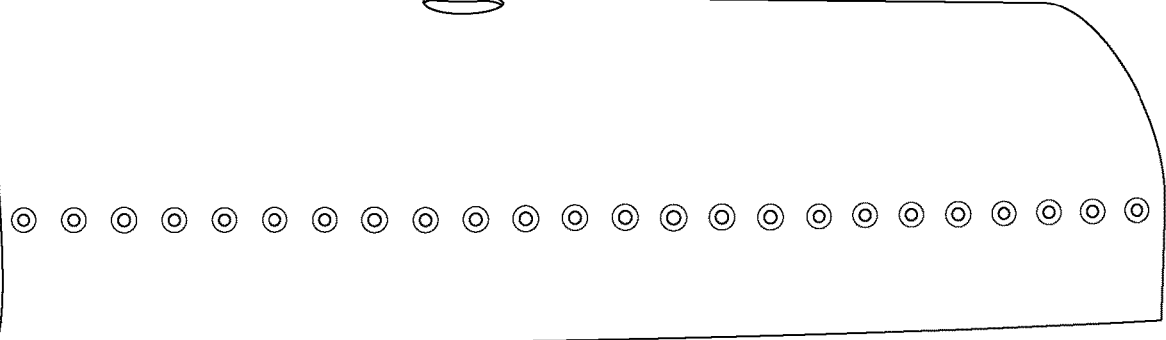
FIG. 2 shows a titanium compression strap.
Figure 3:
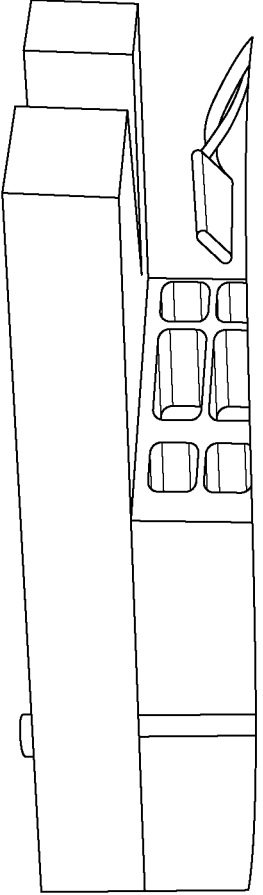
FIG. 3 shows an Ultem end plate.
Figure 4:
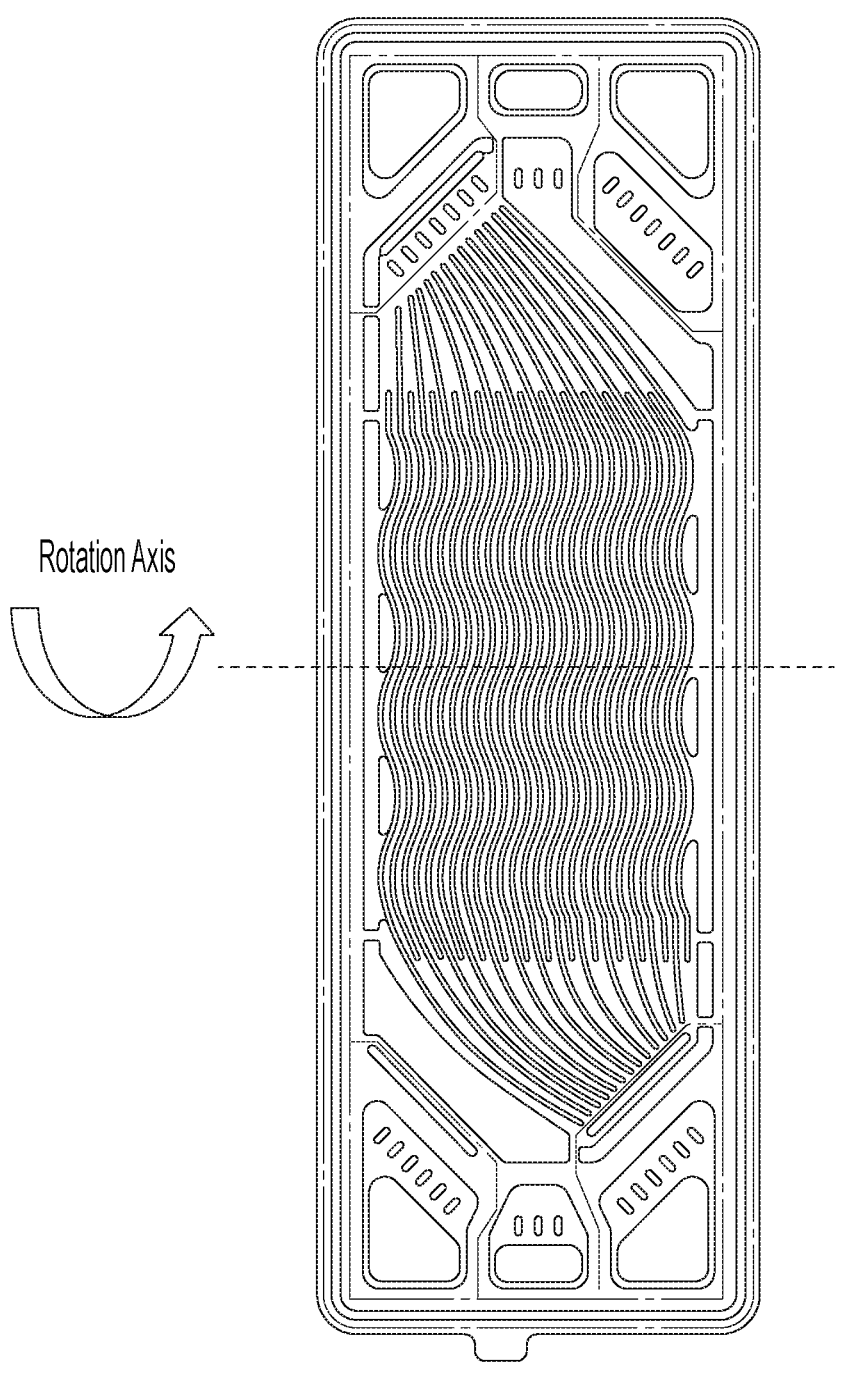
FIG. 4 shows a mechanical drawing of a formed metal bipolar plate.
Figure 5:
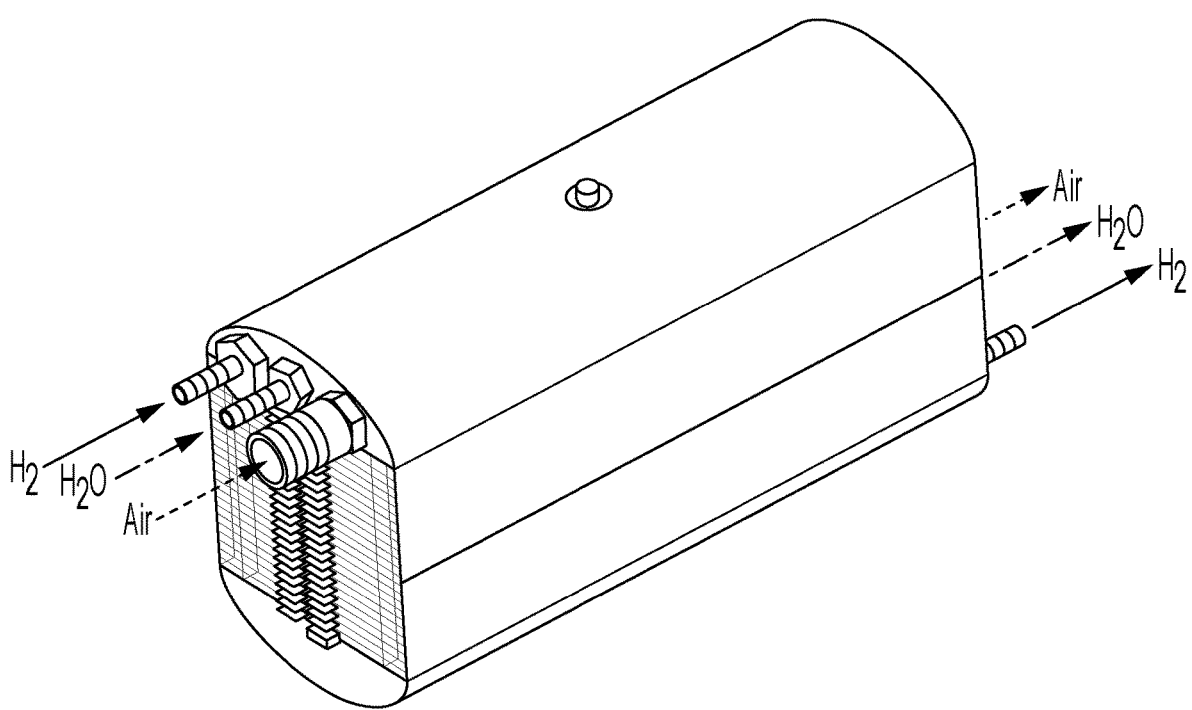
FIG. 5 shows a fully assembled stack after compression.

The basic construction of a fuel cell stack is known in the art, and any configuration that can generate 1-6 kW may be used. FIGS. 2-5 show images of the stack (3) during assembly and details the features in this subsystem. FIG. 2 shows the lightweight titanium compression strap. The strap contains holes that engage with tensioning tools to compress the stack during assembly. FIG. 3 shows the lightweight Ultem end plate. The plate contains alignment features that engage with the assembly jig to keep the stack parallel and plumb during assembly as well as features that align the surrounding compression straps. FIG. 4 shows an individual lightweight bipolar plate with symmetric design. The bipolar plate repeats throughout the fuel cell stack to provide mechanical strength and fluid compartmentalization. FIG. 5 shows a fully assembled lightweight stack after compression with spot welded compression straps. Prior art has shown the use of straps for fuel cell compression (U.S. Pat. Nos. 5,789,091; 6,428,921), but the presently disclosed strap/end plate design is advantageous in terms of weight and uniform compression. Additionally, the method of pre-tensioning the stack using a Kant twist tensioner is advantageous for reducing cell resistance and sealing.

Prior fuel cell designs of less than about 5,000 watts use air delivery systems that rely on fans of various types powered by brushless motors to deliver air to the fuel cell which are not efficient at high altitude. The present fuel cells may be operated at altitudes exceeding 10,000 feet where it is desirable to have a compressor to provide greater than 5 grams/second air at about 1.5 bar to make up for the losses in oxygen content at altitude. This design uses a miniature shrouded compressor wheel design that allows compression of the air at higher efficiencies making a smaller, lighter fuel cell possible as the efficiency of a small compressor is related to the tip losses of the compressor wheel and the RPM at which it spins. Having a relatively high speed shroud design coupled with a brushless motor allows to achieve the desired efficiency. Any such compressor known in the art that can generate 1-6 kW in the present fuel cells may be used.

Figure 6:
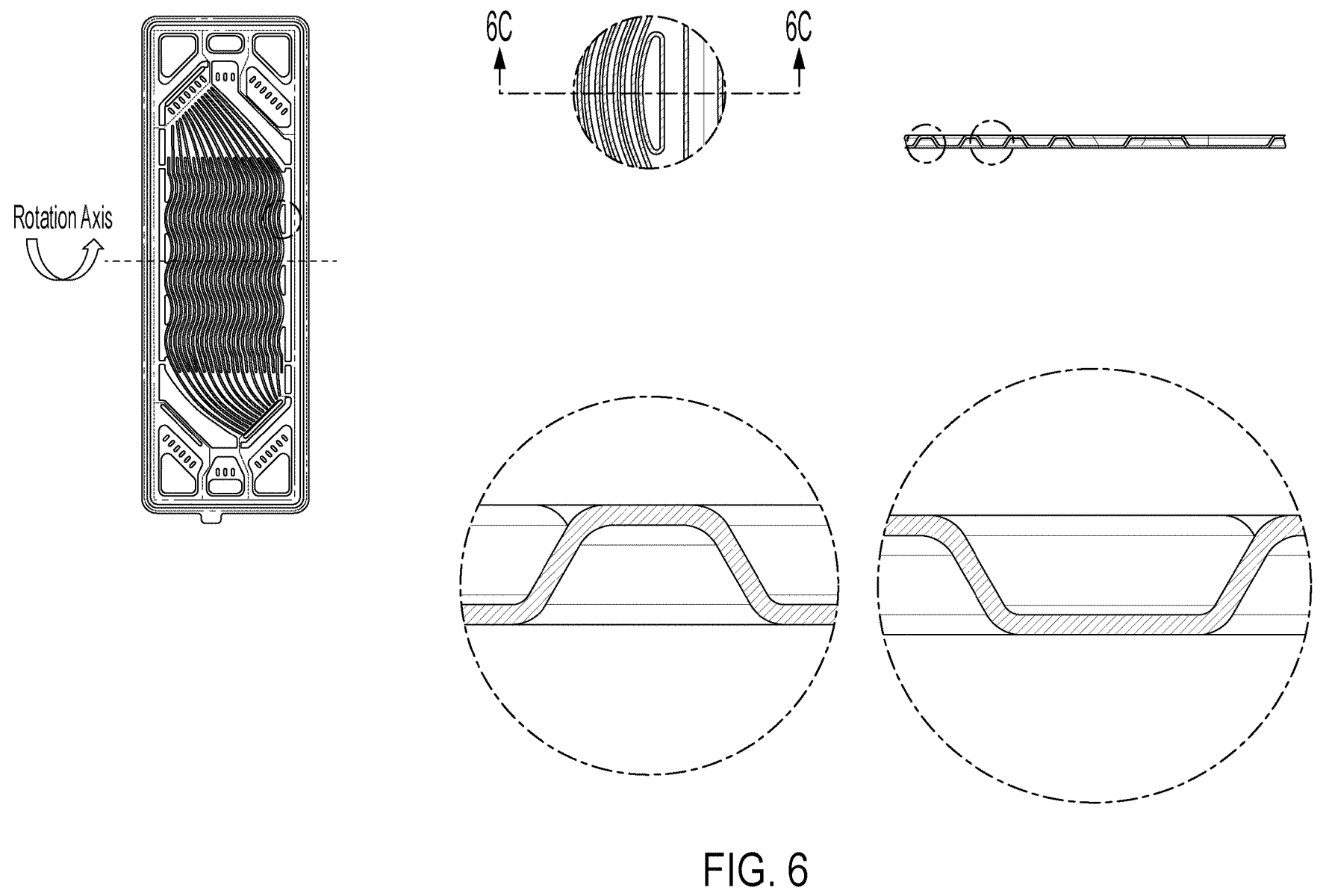

FIG. 6 shows the detailed mechanical drawings of the formed metal bipolar plate. In this design a complete bipolar plate is comprised of two of the pieces in FIG. 6. One piece is oriented to the other piece by rotating about the depicted rotation axis by 180°. The two pieces are then joined by laser welding to make a bipolar plate. Fluid passageways for the coolant are created by the pocket between these two pieces. The flow fields for the air and hydrogen are created by the raised features on the top and bottom of the bipolar plates, resulting in a flow field of multiple, parallel, wavy channels and ribs, also known in the art as lands. Typically formed metal bipolar plates require 2 pieces with 2 separate designs (U.S. Pat. No. 7,855,031).

This design was generated using CFD and the fabrication tools such as additive manufacturing (AM), laser welding, and advanced metal forming techniques may be used in the construction. The bipolar plates are the backbone of the fuel cell, providing fluidic pathways for air, hydrogen, and coolant as well as conductive pathways for electrical current and for heat. In contrast to the graphite bipolar plates in many small fuel cells, metal-foil bipolar plates are more robust and enable stack designs of greater modularity.

Figure 7:
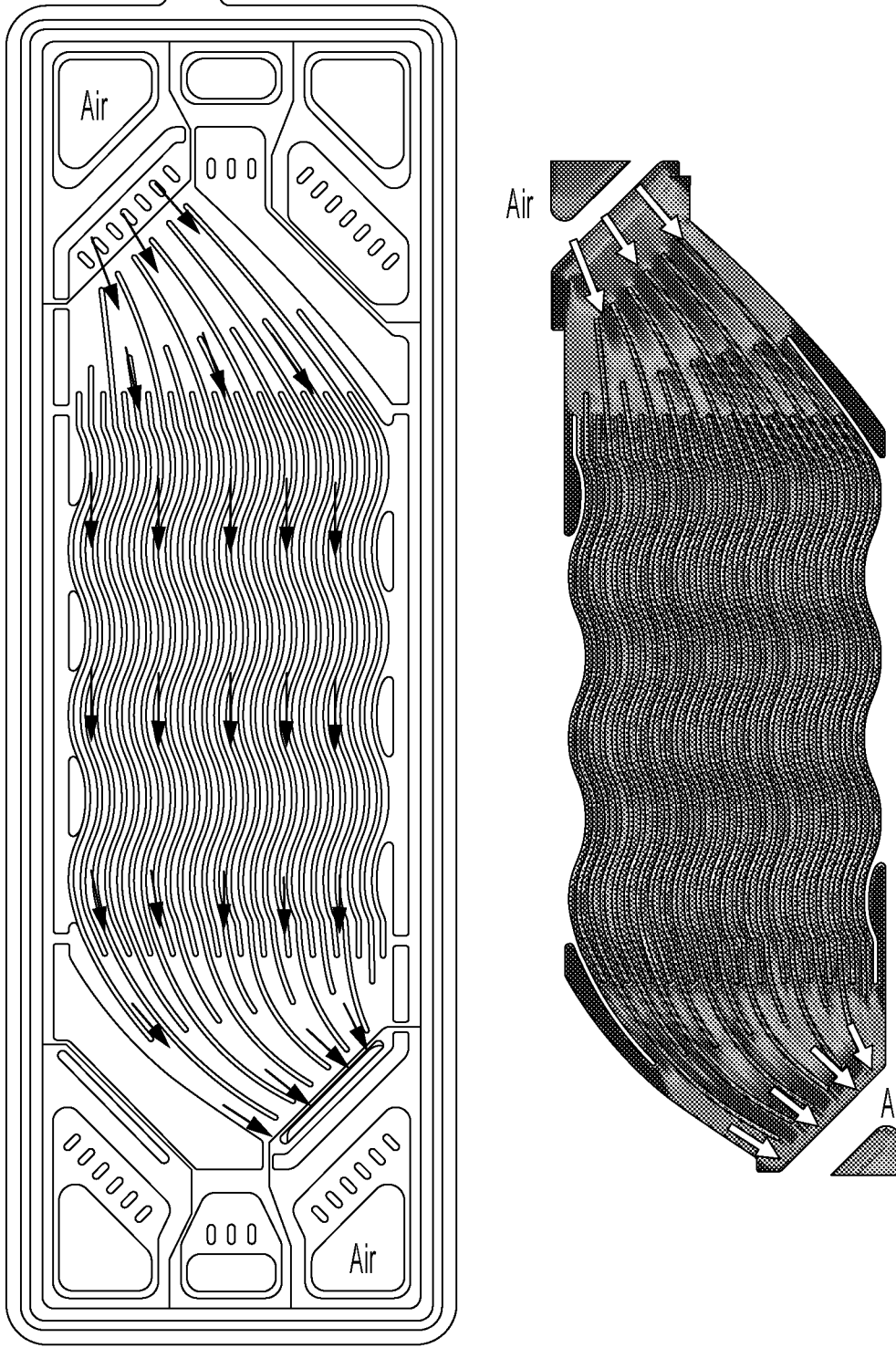
FIG. 7 shows a bipolar plate and a computational fluid dynamics (CFD) simulation.

The design relies on CFD analysis of candidate bipolar plate variants to ensure that reactants and coolant are evenly distributed throughout the stack. FIG. 7 shows the bipolar plate and a CFD simulation that illustrates the nearly uniform flow distribution of air through the plate's channels. From designs that showed promising attributes in CFD, the plates were built by taking advantage of the rapid prototyping capability of additive manufacturing, and then experimentally evaluated each prototype plate. Simulations and the AM-built bipolar plate prototypes were compared, and it was found that a fully viscous flow simulation was required to accurately model the flow of air through the bipolar plate. The bipolar plates shown in FIG. 7 were constructed by hydroforming two pieces of 75-μm-thick stainless steel foil to create the filigree features and then joining the resulting pieces together by laser welding. These bipolar plates have a custom coating that protects them from the corrosive environment of the fuel cell.

The bipolar plates were used to assemble a fuel cell "stack" which was constructed of multiple metal-foil bipolar plates stacked in series with state-of-the-art electrode materials sandwiched between each plate. Unlike the heavy stack compression techniques often used for fuel cells, the stack was wrapped by a tensioned and spot-welded titanium strap, which surrounds the bipolar plates. The stacks can be changed in voltage and power by simply adding more cells.

The other components of the system, such as the humidifier, the cathode back pressure control valve, the hydrogen source, the hydrogen recovery unit, the coolant reservoir, the coolant pump, the radiator bypass control valve, the lightweight aluminum radiator, and the voltage monitoring unit, are known in the art. Any such components that can be used to generate 1-6 kW in the present fuel cells may be used.

Figure 8:
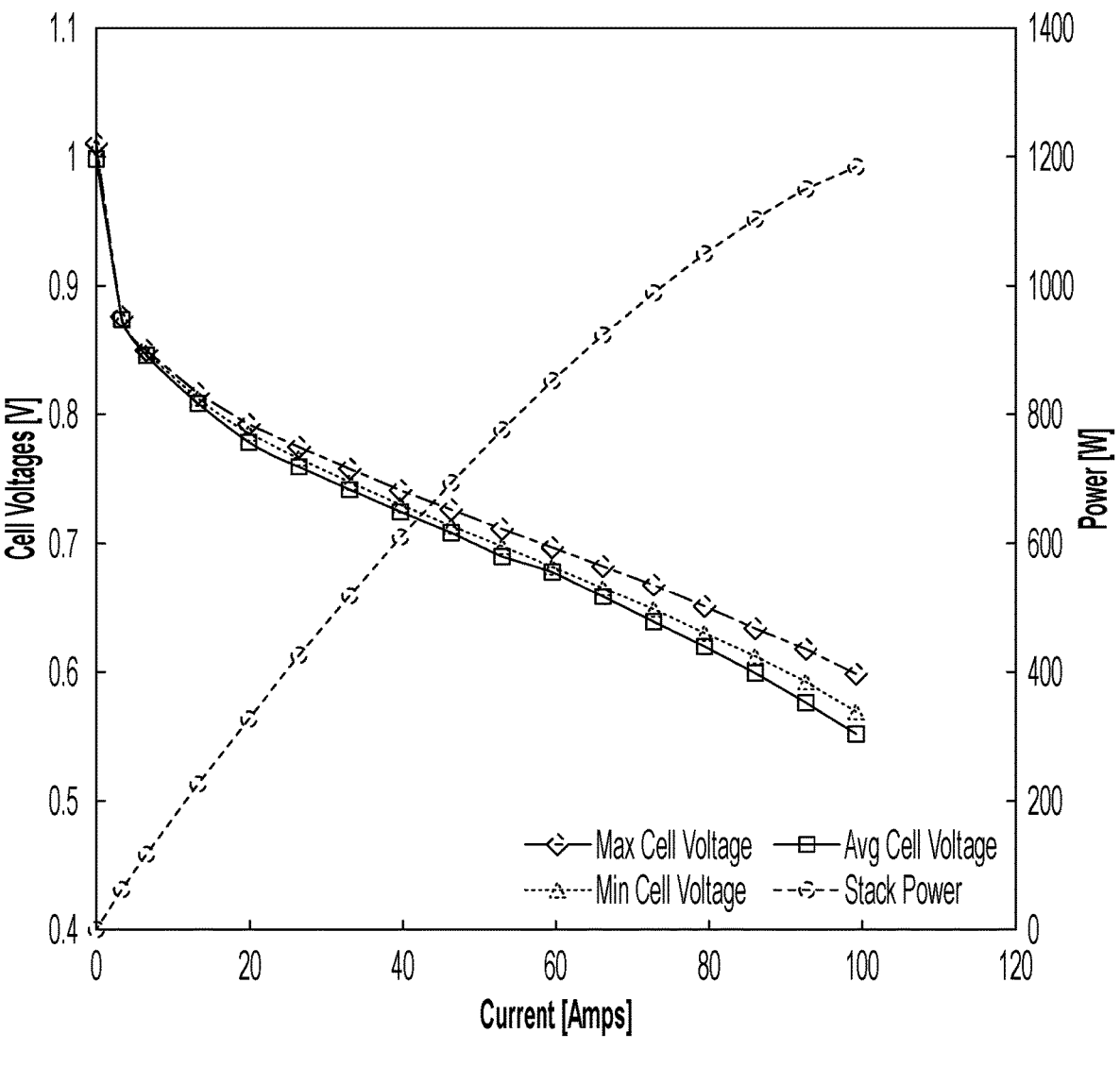
FIG. 8 shows a polarization curve of a 21-cell short stack at relevant operating conditions.
Figure 9:
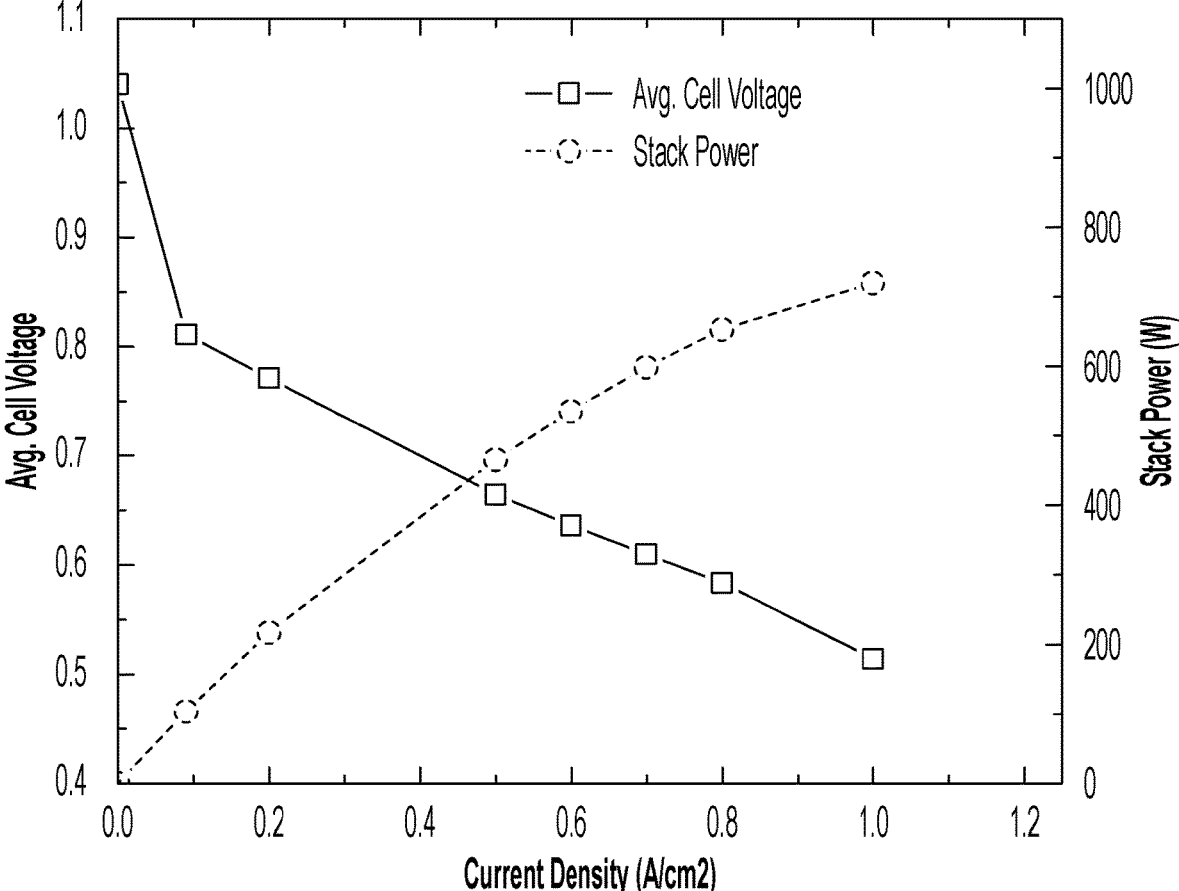
FIG. 9 shows the initial power curve of a 21 cell (⅔ final design) metal stack at 20% RH, 60° C. coolant inlet and 100 kPag cathode backpressure.

FIG. 8 shows the key performance metric of a stack design, its polarization curve. The ⅔ scale system is capable of producing 1200 W at 100 A. The system's power is scalable depending on the amount of cells with approximately 60 W/cell. The system is therefore capable of 1-6 kW by simply changing the number of cells in the stack. FIG. 9 shows the initial power curve of the stack at 20% RH, 60° C. coolant inlet and 100 kPag cathode backpressure.

Obviously, many modifications and variations are possible in light of the above teachings. It is therefore to be understood that the claimed subject matter may be practiced otherwise than as specifically described. Any reference to claim elements in the singular, e.g., using the articles "a", "an", "the", or "said" is not construed as limiting the element to the singular.

The invention claimed is:

1. An apparatus comprising:
a polymer electrolyte membrane fuel cell stack capable of generating 1-6 kW;
    wherein the fuel cell stack comprises:
    a plurality of metal bipolar plates, each bipolar plate comprising two identical contoured metal sheets having a channel therebetween;
    wherein the contoured metal sheets have a rotational axis of symmetry perpendicular to the channel; and
a compressor capable of delivering at least 10 g/s of air at 1-2 bar;
    wherein the compressor is coupled to an air inlet of the fuel cell stack.

2. The apparatus of claim 1, wherein the compressor comprises:
a shrouded compressor wheel.

3. The apparatus of claim 1, further comprising:
a brushless motor coupled to the compressor.

4. The apparatus of claim 1, further comprising:
a coolant system coupled to the channels in the bipolar plates.

5. The apparatus of claim 1, wherein the fuel cell stack comprises:
two polymeric end plates surrounding the bipolar plates and having the same width and length as the bipolar plates.

6. The apparatus of claim 5, wherein the fuel cell stack comprises:
a metal strap wrapped around the end plates and the bipolar plates and applying uniform compression to the fuel cell stack.

7. The apparatus of claim 1, further comprising:

a hydrogen recovery unit coupled to the fuel cell stack.

8. An aerial vehicle comprising the apparatus of claim 1.

9. A method comprising:

piloting the aerial vehicle of claim 8 at an altitude of at least 10,000 feet.

* * * * *